United States Patent
Piccolo

(10) Patent No.: US 6,951,440 B2
(45) Date of Patent: Oct. 4, 2005

(54) DOUBLE-ROTATABLE SPINDLE HEAD FOR MACHINE TOOLS

(75) Inventor: Gabriele Piccolo, Camposampiero (IT)

(73) Assignee: FPT Industrie S.p.A., Camposampiero (IT)

( * ) Notice: Subject to any disclaimer, the term of this patent is extended or adjusted under 35 U.S.C. 154(b) by 0 days.

(21) Appl. No.: 10/398,651

(22) PCT Filed: Apr. 11, 2001

(86) PCT No.: PCT/EP01/04154

§ 371 (c)(1),
(2), (4) Date: Apr. 14, 2003

(87) PCT Pub. No.: WO02/32617

PCT Pub. Date: Apr. 25, 2002

(65) Prior Publication Data

US 2004/0013487 A1 Jan. 22, 2004

(30) Foreign Application Priority Data

Oct. 17, 2000 (IT) ................................. VE2000U0025

(51) Int. Cl.⁷ ................................................ B23C 1/12
(52) U.S. Cl. ...................... 409/216; 409/201; 408/236; 901/23
(58) Field of Search ................................. 409/216, 201, 409/211; 408/236; 901/23, 24

(56) References Cited

U.S. PATENT DOCUMENTS

| | | | | |
|---|---|---|---|---|
| 5,127,779 A | * | 7/1992 | Yang | 409/201 |
| 5,413,439 A | | 5/1995 | Wu et al. | |
| 5,584,621 A | | 12/1996 | Bertsche et al. | |
| 6,669,416 B2 | * | 12/2003 | Klement | 409/216 |
| 6,746,188 B2 | * | 6/2004 | Watanabe | 409/201 |
| 2004/0134050 A1 | * | 7/2004 | Geissler | 409/201 |

FOREIGN PATENT DOCUMENTS

| | | | |
|---|---|---|---|
| CA | 2268202 A1 | * | 10/2000 |
| EP | 0 513 716 A2 | | 11/1992 |
| EP | 0 659 520 A1 | | 6/1995 |
| EP | 1 038 630 A1 | | 7/2000 |
| FR | 2 248 684 | | 5/1975 |

* cited by examiner

*Primary Examiner*—Erica Cadugan
(74) *Attorney, Agent, or Firm*—Hoffman, Wasson & Gitler, PC

(57) ABSTRACT

A double rotatable spindle head of non-perpendicular axis type has a first half head and a second half head. The first half head is connected to the machine structure and rotates about a first axis. The second half head is coupled to the first half head on a flat surface and rotates about a second axis perpendicular to the flat surface. The rotation of the first and second half heads is achieved by a first and second direct motor, respectively.

5 Claims, 2 Drawing Sheets

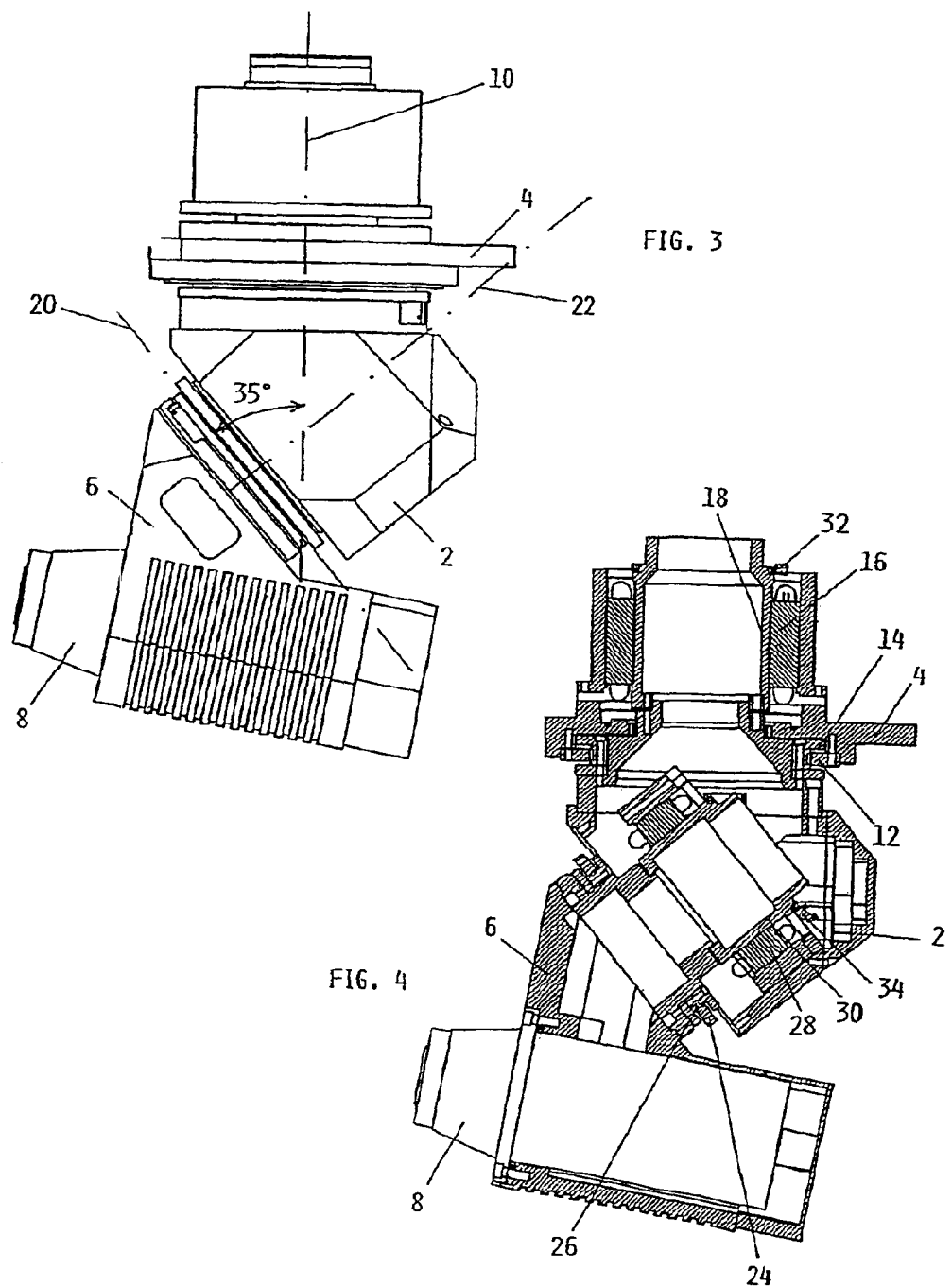

DOUBLE-ROTATABLE SPINDLE HEAD FOR MACHINE TOOLS

This invention relates to a double-rotatable spindle head for machine tools.

Double-rotatable spindle heads for machine tools are known. They are divided substantially into double-rotatable heads with perpendicular axes and double-rotatable heads with non-perpendicular axes. Both comprise a first half-head pivoted to the machine structure about a first axis and a second half-head pivoted to the first half-head about a second axis. However while in double-rotatable heads of the first type the two axes of rotation are mutually perpendicular, in machines of the second type the two axes of rotation are not mutually perpendicular.

Double-rotatable heads of the first type, which often present serious limitations in terms of their ability to make the tool approach the surface of the workpiece, and in particular penetrate into the cavity in the workpiece, do not generally present difficulties in orientating the tool axis in the desired spatial direction, in that they enable this orientation to be achieved by rotating said axis about one or both the relative axes of the machine.

Double-rotatable heads of the second type are more advantageous than those of the first type with regard to approaching the surface of the workpiece with their tool, but at the same time are more complicated in terms of their programming and their operational precision. In particular, in this respect even though variations in the tool axis orientation can be thought of as rotations thereof about a physical axis, in reality they are achieved by rotation about a virtual axis as result of several combined machine movements, which can totally or partially involve the three linear X, Y and Z axes and the two rotation axes.

For these reasons, double-rotatable heads with non-perpendicular axes have intrinsically to be more precise than those with perpendicular axes, this precision being generally obtained by constructing these heads mainly for indexed positioning, achieved generally by Hirth toothed precision rings.

However Hirth rings, which are precise and practically without slack, enable only discrete positions to be obtained. This means that the angular positions obtainable for the tool depend on the combination of discrete angles of rotation and are therefore not infinitely variable.

According to the present invention the problem is solved by a double-rotatable spindle head of non-perpendicular axis type for machine tools having direct drive motors.

A preferred embodiment of the invention is described in detail hereinafter with reference to the accompanying drawings, in which:

FIG. 3 is a side view thereof in a configuration with the tool axis at an angle of 110° to the first axis; and FIG. 4 is a vertical section therethrough in the same configuration as FIG. 3.

Figure 1:
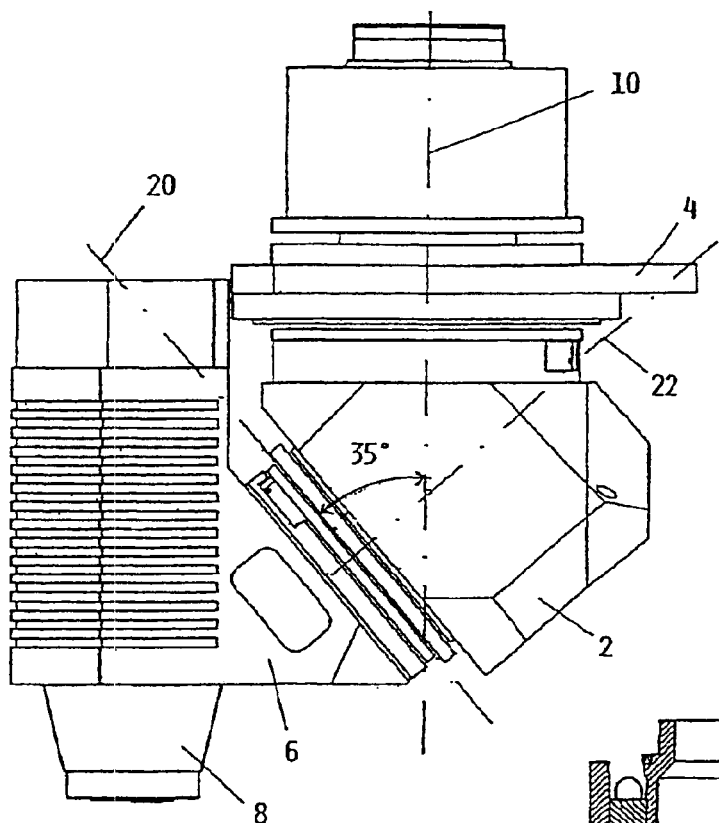
FIG. 1 is a side view of a double-rotatable head of the invention in a configuration with the tool axis parallel to the first axis.
Figure 2:
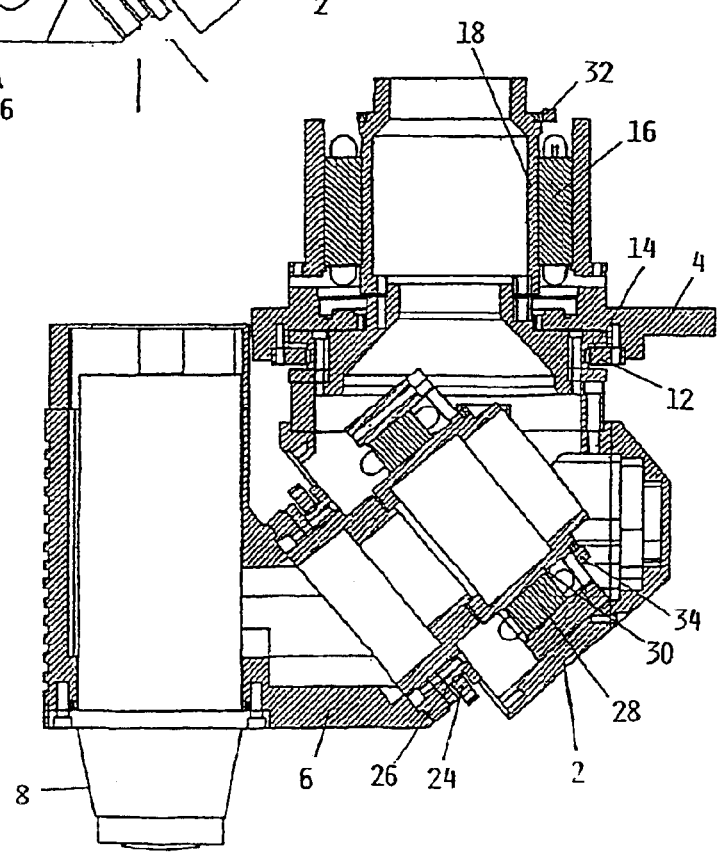
FIG. 2 is a vertical section therethrough in the same configuration as FIG. 1.

As can be seen from the figures, the double-rotatable head of the invention comprises, in traditional manner, a first half-head 2 applied to the machine tool structure (not shown) via a connection element 4, and a second half-head 6 supporting the tool spindle 8. The first half-head 2 can rotate with respect to the machine structure, and hence to the connection element 4 about a first axis 10 by virtue of the presence of guide bearings 12 applied to said connection element 4 and engaging a circumferential groove 14 provided in the casing of the first half-head 2.

The first half-head 2 is rotated with respect to the connection element 4 by a direct motor, the stator 16 of which is rigid will said connection element 4 and the rotor 18 of which is rigid with said first half-head 2.

The second half-head 6 and the first half-head 2 are coupled together on a flat surface, the representation of which in the plane of the drawing is indicated by the line 20. This surface forms an angle of 35° with the first axis 10.

The second half-head 6 can rotate with respect to the first half-head 2 about a second axis 22, by virtue of the presence of guide bearings 24 applied to said first half-head 2 and engaging a circumferential groove 26 provided in the casing of the second half-head 6.

The second half-head 6 is rotated with respect to the first half-head 2 by a direct motor, the stator 28 of which is rigid with said first half-head 2 and the rotor 30 of which is rigid with said second half-head 6.

Both the direct motors, i.e. that interposed between the connection element 4 and the first half-head 2 and that interposed between the first half-head 2 and the second half-head 6, can be either permanent magnet synchronous motors or induction motors. The angular position of the first half-head 2 to the connection element 4 and the angular position of the second half-head 6 to the first half-head 2 are controlled by respective position transducers 32, 34.

In operation, while the rotation of the direct motor interposed between the connection element 4 and the first half-head 2 causes both the half-heads 6 and 2 to rotate about the first axis 10 and hence cause the tool axis to describe a conical surface, which becomes cylindrical when the two axes are parallel, rotation of the direct motor interposed between the first half-head 2 and the second half-head 6 causes this latter to rotate about the second axis 22 to hence vary the angle between the first axis 10 and the spindle axis.

More specifically, this angle can vary from 0° to 110° and assume all intermediate values between these two end values.

Consequently, by suitably controlling the two direct motors the spindle axis can be made to assume any spatial direction within a cone having a vertex angle of 220°.

From the a foregoing it is apparent that the double-rotatable head of the invention is particularly advantageous compared with traditional double-rotatable heads, and in particular:

- it enables the tool axis to be orientated with continuity in any spatial direction with high positioning precision and with elimination of slack and friction between the relatively-moving parts,
- it enables the tool to be positioned in strict proximity to the surface of the workpiece,
- it ensures good penetrability of the tool and its spindle into any cavities in the workpiece,
- it enables undercuts to be machined.

What is claimed is:

1. A double rotatable spindle head of the non-perpendicular axis type for machine tools, comprising a first half-head pivoted to a machine structure about a first axis,
   a second half-head for supporting a tool spindle coupled to the first half-head on a flat surface and pivoted about a second axis perpendicular to said flat surface,
   said flat surface forming an angle of less than 45° with said first axis such that undercutting is enabled,
   a first direct motor for rotating said first half head with respect to said machine structure, and
   a second direct motor for rotating said second half-head with respect to said first half head.

2. A double rotatable spindle head as claimed in claim 1, comprising a first transducer for controlling the angular position of the first half-head with respect to the machine structure and a second transducer for controlling the angular position of the second half-head with respect to the first half-head.

3. A double rotatable spindle head as claimed in claim 1, wherein the flat surface forms an angle between 35° and 40° with said first axis.

4. A double rotatable spindle head as claimed in claim 1, wherein said second direct motor comprises a first part integral with said first half-head and a second part integral with said second half-head.

5. A double rotatable spindle head as claimed in claim 4, wherein said first part comprises a stator and said second part comprises a rotor.

* * * * *